(12) United States Patent
Shen et al.

(10) Patent No.: US 12,118,036 B2
(45) Date of Patent: *Oct. 15, 2024

(54) SUMMARIZING VIDEO CONTENT

(71) Applicant: Google LLC, Mountain View, CA (US)

(72) Inventors: Yi Shen, Palo Alto, CA (US);
Xiangrong Chen, Fremont, CA (US);
Min-hsuan Tsai, San Jose, CA (US);
Yun Shi, Sunnyvale, CA (US);
Tianpeng Jin, Shanghai (CN); Zheng Sun, Sunnyvale, CA (US); Weilong Yang, Fremont, CA (US); Jingbin Wang, Mountain View, CA (US);
Carolyn Au, Mountain View, CA (US);
James Futrell, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,067

(22) Filed: Jun. 18, 2021

(65) Prior Publication Data
US 2021/0312186 A1    Oct. 7, 2021

Related U.S. Application Data

(63) Continuation of application No. 16/475,361, filed as application No. PCT/US2017/045306 on Aug. 3, (Continued)

(51) Int. Cl.
*G06F 16/738* (2019.01)
*G06F 16/783* (2019.01)
(Continued)

(52) U.S. Cl.
CPC ........ *G06F 16/739* (2019.01); *G06F 16/7837* (2019.01); *G06F 16/785* (2019.01);
(Continued)

(58) Field of Classification Search
CPC .. G06F 16/739; G06F 16/7837; G06F 16/785; G06F 16/786; G06F 18/22;
(Continued)

(56) References Cited

U.S. PATENT DOCUMENTS 5,911,008 A     6/1999  Niikura
9,818,451 B1 *  11/2017 Tyagi .................. G11B 27/3081
(Continued)

FOREIGN PATENT DOCUMENTS

CN          110347872 A  * 10/2019
WO     WO-2016/038522 A1    3/2016
WO     WO-2018/004733 A1    1/2018

OTHER PUBLICATIONS

English Translation of Chinese Publication CN 205621024 (Year: 2016).*

(Continued)

*Primary Examiner* — Loi H Tran
(74) *Attorney, Agent, or Firm* — MARSHALL, GERSTEIN & BORUN LLP

(57) ABSTRACT

Systems and methods of automatically extracting summaries of video content are described herein. A data processing system can access, from a video database, a first video content element including a first plurality of frame. The data processing system can select an intervallic subset of the first plurality of frames of the first video content element. The data processing system can calculate, for each of a plurality of further subsets comprising a predetermined number of frames from the intervallic subset, a score for the further subset. The data processing system can identify, from the
(Continued)

plurality of further subsets, a further subset having a highest score. The data processing system can select a portion of the first video content element comprising the frames of the further subset having the highest score. The data processing system can generate a second video content element comprising the selected portion of the first video content element.

25 Claims, 8 Drawing Sheets

Related U.S. Application Data 2017, now Pat. No. 11,042,754, which is a continuation of application No. PCT/CN2017/083223, filed on May 5, 2017.

(51) Int. Cl.
| | | |
|---|---|---|
| *G06F 18/22* | (2023.01) | |
| *G06T 7/20* | (2017.01) | |
| *G06T 7/90* | (2017.01) | |
| *G06V 20/40* | (2022.01) | |
| *G11B 27/031* | (2006.01) | |

(52) U.S. Cl.
CPC ............ *G06F 16/786* (2019.01); *G06F 18/22* (2023.01); *G06T 7/20* (2013.01); *G06T 7/90* (2017.01); *G06V 20/47* (2022.01); *G11B 27/031* (2013.01); *G06T 2207/10016* (2013.01)

(58) Field of Classification Search
CPC ........ G06V 20/47; G06K 9/6215; G06T 7/20; G06T 7/90; G06T 2207/10016; G11B 27/031
USPC .......................................... 386/278
See application file for complete search history.

(56) References Cited

U.S. PATENT DOCUMENTS

| | | | |
|---|---|---|---|
| 10,467,507 B1* | 11/2019 | Hao | G06V 30/19173 |
| 11,042,754 B2 | 6/2021 | Shen et al. | |
| 11,418,562 B2* | 8/2022 | Cain | H04N 21/6125 |
| 2006/0003300 A1* | 1/2006 | Davis | A63B 24/0003 434/247 |
| 2009/0080853 A1 | 3/2009 | Chen et al. | |
| 2011/0007797 A1* | 1/2011 | Palmer | G11B 27/034 375/E7.076 |
| 2012/0106837 A1* | 5/2012 | Partis | G06V 10/255 382/165 |
| 2013/0093899 A1* | 4/2013 | Curcio | G06F 16/58 707/E17.089 |
| 2014/0023348 A1* | 1/2014 | O'Kelly | G11B 27/031 386/278 |
| 2014/0037269 A1 | 2/2014 | Kumar | |
| 2014/0038269 A1 | 2/2014 | Ikeda | |
| 2014/0156651 A1 | 6/2014 | Rayter | |
| 2015/0186373 A1* | 7/2015 | Hellier | H04N 1/60 382/165 |
| 2017/0060831 A1* | 3/2017 | Smythe | G06F 40/289 |
| 2017/0177970 A1* | 6/2017 | Kitajima | G06F 18/22 |
| 2017/0228599 A1* | 8/2017 | De Juan | G06V 20/70 |
| 2018/0004760 A1* | 1/2018 | Bataller | G06N 5/04 |
| 2018/0137389 A1* | 5/2018 | Mathieu | G06V 10/454 |
| 2018/0197577 A1* | 7/2018 | Farre Guiu | G06F 16/739 |
| 2018/0286049 A1* | 10/2018 | Linard | G06T 7/174 |

OTHER PUBLICATIONS

Bandoh et al., "Optimization of Temporal Down-Sample for High Frame-Rate Video Signal Based on Dynamic Programming", Transactions of IEICE, IEICE, vol. J96-A, No. 8, Aug. 1, 2013, pp. 562-571 (10 pages).

Examination Report for EP Appln. Ser. No. 17754539.9 dated Dec. 22, 2020 (5 pages).

International Preliminary Report on Patentability on PCT Appl. Ser. No. PCT/US2017/045306 dated Nov. 14, 2019 (15 pages).

International Search Report and Written Opinion on PCT/US2017/045306 dated Feb. 5, 2018.

Office Action for JP Appln. Ser. No. 2019-541309 dated Apr. 6, 2020 (6 pages).

Office Action for KR Appln. Ser. No. 10-2019-7021054 dated Oct. 30, 2020 (6 pages).

Ajmal et al., "Video Summarization: Techniques and Classification," Advances in Biometrics: International Conference (Sep. 24, 2012).

Examination Report for European Application No. 17754539.9, dated Mar. 15, 2023.

\* cited by examiner

SUMMARIZING VIDEO CONTENT

CROSS-REFERENCE TO RELATED PATENT APPLICATIONS

This application claims priority under 35 U.S.C. § 120 as a continuation of U.S. patent application Ser. No. 16/475,361, filed Jul. 1, 2019, which is a National Stage Application under 35 U.S.C. § 371 of International Application No. PCT/US2017/045306, filed Aug. 3, 2017, which claims the benefit of priority to International Application No. PCT/CN2017/083223, filed May 5, 2017, each of which are hereby incorporated by reference in their entirety.

BACKGROUND

Video content elements may be provided over computer networked environments for rendering and playing on client devices. Such video content elements may be of some duration of time, and may consume a corresponding amount of computer processing power and network bandwidth. Delivering such content in advance of requests for the content (e.g. as "pushed" content, content embedded in or provided as part of another, requested item of content, or other such delivery mechanisms) may result in significant consumption of bandwidth, processing power, and, on mobile devices, battery power.

SUMMARY

Bandwidth, processing power, and battery power may be reduced by delivering a shortened form of the content, referred to as a shortened or summarized version of the content. The shortened or summarized version may be automatically generated, without requiring user intervention, selection of components, or subjective determinations of value of segments. Upon a request by a content provider or delivery of content to a processing device, the processing device can automatically generate the shortened or summarized version of a video content element. In some implementations, the server can down-sample the video content element (e.g., to one frame per second, two frames per second, one frame per two seconds, or any other such rate), which may be referred to as selecting an intervallic subset of the frames of the video content element. The server system can then evaluate or analyze each frame of the down-sampled video content element by applying a plurality of processing rules and value calculations via multiple evaluators. These evaluators may include an image quality comparator, an object detector, a motion detector, and a color distribution measurer, among others. By down-sampling the video content element prior to analyzing each frame, the server system can reduce computing resources used to execute otherwise resource-heavy image analysis algorithms of each evaluator.

Using a trained model, the image quality comparator may evaluate a quality of each frame of the down-sampled video content element. The model may have been trained with one set of frames randomly selected from other videos marked as negative and another set of frames from other video videos marked as positive. By applying the model, the image quality comparator can compare the frame to positive and negative samples. The image comparator can determine how similar frames from the down-sampled video content element are to positive and negative samples, and can calculate a score from the determined similarity.

To detect objects within each frame of the down-sampled video content element, the object detector can apply image recognition algorithm to each frame. The image recognition algorithm may include face detection and optical character recognition, among other pattern recognition techniques. Upon detection of an object within a frame, the object detector can identify various characteristics of the object (e.g., size, color, font, etc.). The object detector can then calculate a score according to a number of detected objects and the various characteristics identified for each object.

Between adjacent frames of the down-sampled video content element, the motion detector can determine per-pixel measure of motion from frame to frame. The motion detector can compare the motion measure to a ceiling threshold and to a floor threshold. If the motion measure is within the ceiling and floor threshold, the motion detector can calculate and adjust a score based on a difference or distance between the measure and the ceiling threshold and between the measure and the floor threshold. The motion detector can thus assign higher scores to consecutive frames with a moderate amount of motion.

For each frame, the color distribution measurer can calculate a distribution of color among pixels of the frame. The distribution of the color may be indicative of the variance or a standard deviation of the color within a single frame. Based on the calculated distribution of color among the pixels of the frame, the color distribution measurer can determine a score for the frame of the down-sampled video content. The determination of the score may be in view of a distribution to score mapping.

Having analyzed each frame of the down-sampled video content element, the server system can calculate a weighted average of the scores from each of the frame evaluators. The server system can then use a sliding window to calculate a score for a subset of frames within the window. The length of the window may be set to correspond to a maximum length of a truncated or summarized video content element. From the calculation of the sums, the server system can identify the highest sum. The server system can then select the subset of frames from the down-sampled video content element corresponding to the sliding window of the highest sum. The server system can identify the subset of frames of the original video content element corresponding to the selected subset of frames of the down-sampled video content element as the summarized video content element. By providing a summarized video content element with a reduced number of frames to client devices, the server system can reduce the amount of bandwidth consumed, in comparison to delivering the full video content element. In addition, the summarized video content element can decrease the amount of computing resources in processing and playing the video content at the client devices.

As the frames of the video content element were analyzed after down-sampling, the selected subset of frames, the selection of the subset of frames of the summarized video content element may include frames of different scenes. To eliminate different scenes, the server system can detect an initial shot frame and a terminal shot frame of a single scene within the frames of the selected subset, and may truncate the video content element to those frames between the initial and terminal shot frames. The server system can also append a subset of selected frames as identified including particular objects.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of automatically extracting summaries of video content in a computer network environment. The various concepts introduced above and discussed in greater detail below may be implemented in any of numerous ways, as the described concepts are not limited to any particular manner of implementation.

The systems and methods described herein may address problems associated with automatic generation of summaries of video content. The summaries of video content can provide video content that provides information content of the original video in a compressed format of the original video. Summaries of video content can therefore allow video content to be previewed by a user of a client device using a small amount of data relative to the original video and can therefore, for example, reduce bandwidth usage by allowing a user to receive full video content, once a determination that such full video content is desired.

Figure 1:
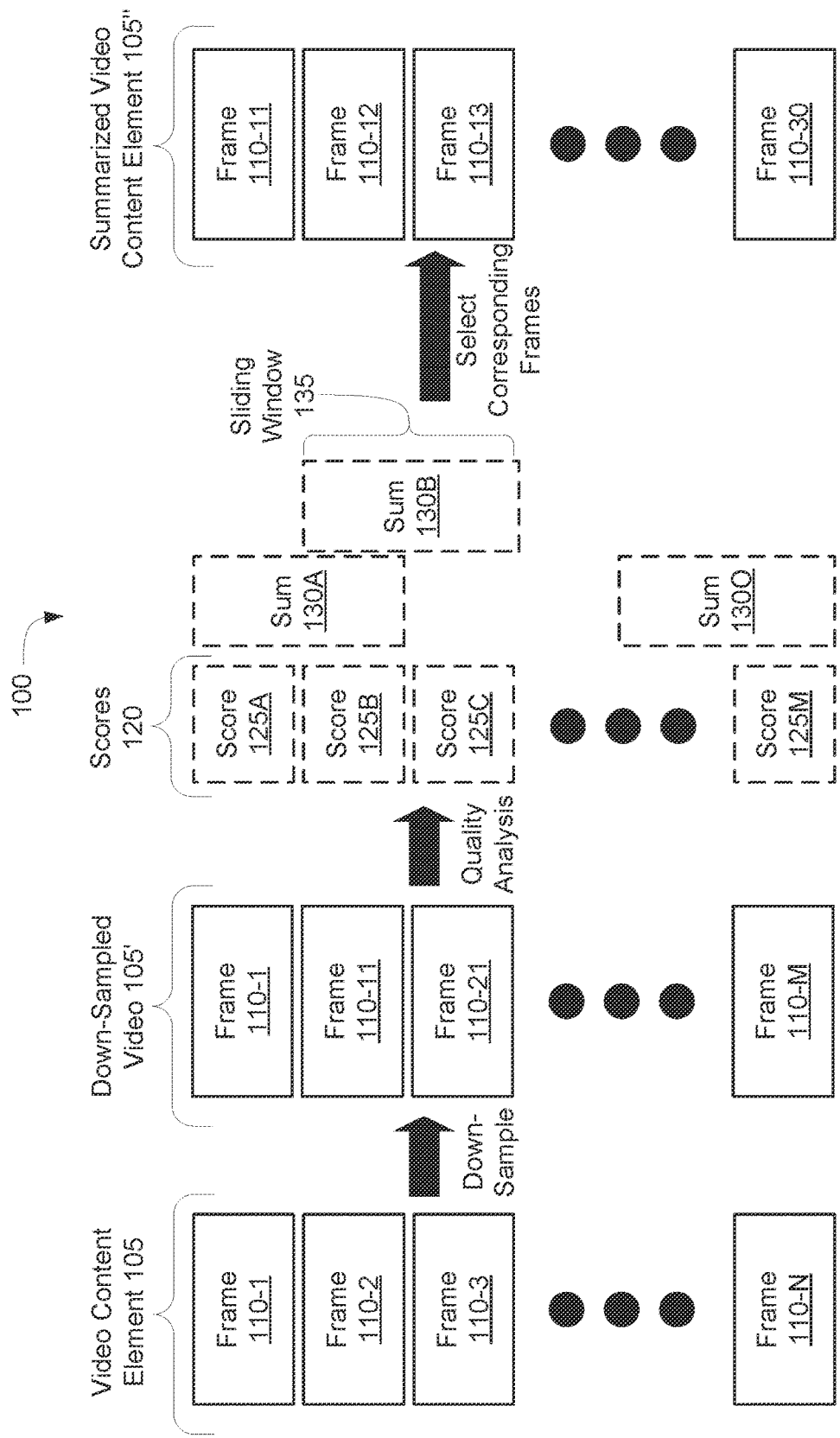
FIG. 1 is a block diagram depicting a process of automatically extracting summaries of video content in a computer network environment, according to an illustrative implementation.

Referring first to FIG. 1, illustrated is a block diagram depicting a process 100 of automatically extracting summaries of video content. The functionality described herein described in the process 100 can be performed by a data processing system or any one or more components or modules of the system 200 shown in FIG. 2 or of the system 400 in FIG. 4 as described below. The process 100 may start with an original video content element 105, which may comprise a raw or uncompressed video file, compressed video file, collection of individual images of an animation or video, or any other type and form of video element. Although primarily discussed in terms of video content and analysis, the content item may be a multimedia content item comprising video and audio. The video content element 105 can include N frames 110-1 through 110-N. The frames 110-1 through 110-N may be configured or identified for playback by a video player on a computing device at any frame rate (e.g., from 10 frames per second to 600 frames per second).

The original video content element 105 may be down-sampled to form a down-sampled video content element 105'. The down-sampled video content element 105' can include an intervallic subset of the frames of the original video content element 105, or a subset of frames selected according to a predetermined period or interval number of frames (e.g. one of every ten frames, one of every thirty frames, etc.). In the implementation depicted in FIG. 1, the down-sampled video content element 105' includes every tenth frame of the original video content element 105 (e.g., frames 110-1, 110-11, 110-21, to 110-M). The use of every tenth frame is one example, and other sample rate values may be used. By down-sampling the original video content element 105, computing resources may be reduced in the applying various quality analysis techniques to the down-sampled video content element 105'.

Having down-sampled the video content element 105, frame evaluators may be applied on the individual frames of the down-sampled video content element 105' to calculate scores 125A through 125M, referred to generally as score(s) 120. In some implementations, the frame evaluators may include an image quality comparator, an object detector, a motion detector, and a color distribution measurer, among others.

The image quality comparator can calculate a score for each frame of the down-sampled video content element 105' based on a comparison between the frame with other images marked as positive or negative. For example, in some implementations, using a trained model, the image quality comparator may evaluate a quality of each frame of the down-sampled video content element. The model may have been trained with one set of frames randomly selected from other videos marked as negative and another set of frames from other video videos marked as positive. By applying the model, the image quality comparator can compare the frame to positive and negative samples. The image comparator can determine how similar frames from the down-sampled video content element that are similar to positive and negative samples, and can calculate a score from the determined similarity.

The object detector can calculate another score for each frame using objects and various characteristics of the objects identified in the frame using image recognition algorithms. In some implementations, to detect objects within each frame of the down-sampled video content element, the object detector can apply image recognition algorithm to each frame. The image recognition algorithm may include face detection and optical character recognition, among other pattern recognition techniques. Upon detection of an object within a frame, the object detector can identify various characteristics of the object (e.g., size, color, font, etc.). The object detector can then calculate a score according to a number of detected objects and the various characteristics identified for each object.

The motion detector can calculate another score for each frame based on an amount of motion between adjacent frames of the down-sampled video content element 105'. For example, in some implementations, between adjacent frames of the down-sampled video content element, the motion detector can determine per-pixel measure of motion from frame to frame. The motion detector can compare the motion measure to a ceiling threshold and to a floor threshold. If the motion measure is within the ceiling and floor threshold, the motion detector can calculate and adjust a score based on a difference or distance between the measure and the ceiling threshold and between the measure and the floor threshold. The motion detector can thus assign higher scores to consecutive frames with a moderate amount of motion.

The color distribution measurer can calculate another score for each frame of the down-sampled video content element 105' based on a color distribution of the pixels on the corresponding frame. For each frame, the color distribution measurer can calculate a distribution of color among pixels of the frame. The distribution of the color may be indicative of the variance or a standard deviation of the color within a single frame. Based on the calculated distribution of color among the pixels of the frame, the color distribution measurer can determine a score for the frame of the down-sampled video content. The determination of the score may be in view of a distribution to score mapping.

Using the scores calculated with the various quality analysis techniques, each frame of the down-sampled video content element 105' may be assigned a corresponding composite score 125A-125M. Each composite score 125A-125M may be a weighted summation or weighted average of the scores calculated by the frame evaluators. In some implementations, scores may be accumulated after each serial processing or analysis step (e.g. adding a newly calculated score to a previous total), while in other implementations, processing or analysis may be performed in parallel and scores totaled together.

A sliding window 135 may then be used to calculate a summation of multiple composite scores 130A-130O (e.g., scores 125B and 125C summing up to 130B) across the corresponding frames of the down-sampled video content element 105' (e.g., frames 110-11 and 110-21). The length of the window may be set to correspond to a maximum length of a truncated or summarized video content element.

Among the summation of scores 130A-130O, the maximum summation of multiple scores using the sliding window 135 can be identified (e.g., sum 130B). The frames of the down-sampled video content element 105' corresponding to the maximum summation of multiple scores can be selected (e.g., frames 110-11 and 110-21). The frames of the original video content element 105 corresponding to these selected frames can then be identified (e.g., frames 110-11 through 110-30, for an implementation with ten-to-one down-sampling) can be identified to create a summarized video content element 105". Thus, in some implementations, the server system can identify the subset of frames of the original video content element corresponding to the selected subset of frames of the down-sampled video content element as the summarized video content element.

Compared to the full, original video content element 105, the summarized video content element 105" may include fewer frames or cover a shorter duration of time (e.g. five seconds rather than sixty seconds, or any other such time, based on the size of the sliding window). In this manner, the delivery of the summarized video content element 105" can reduce the amount of bandwidth and other network resources consumed per video, relative to providing the full video content element 105. In addition, the summarized video content element 105" can decrease the amount of computing resources in processing and rendering the video content at the client devices.

As the frames of the video content element were analyzed after down-sampling, the selected subset of frames, the selection of the subset of frames of the summarized video content element may include frames of different scenes. To eliminate different scenes, the server system can detect an initial shot frame and a terminal shot frame of a single scene within the frames of the selected subset, and may truncate the video content element to those frames between the initial and terminal shot frames. The server system can also append a subset of selected frames as identified including particular objects.

Figure 2:
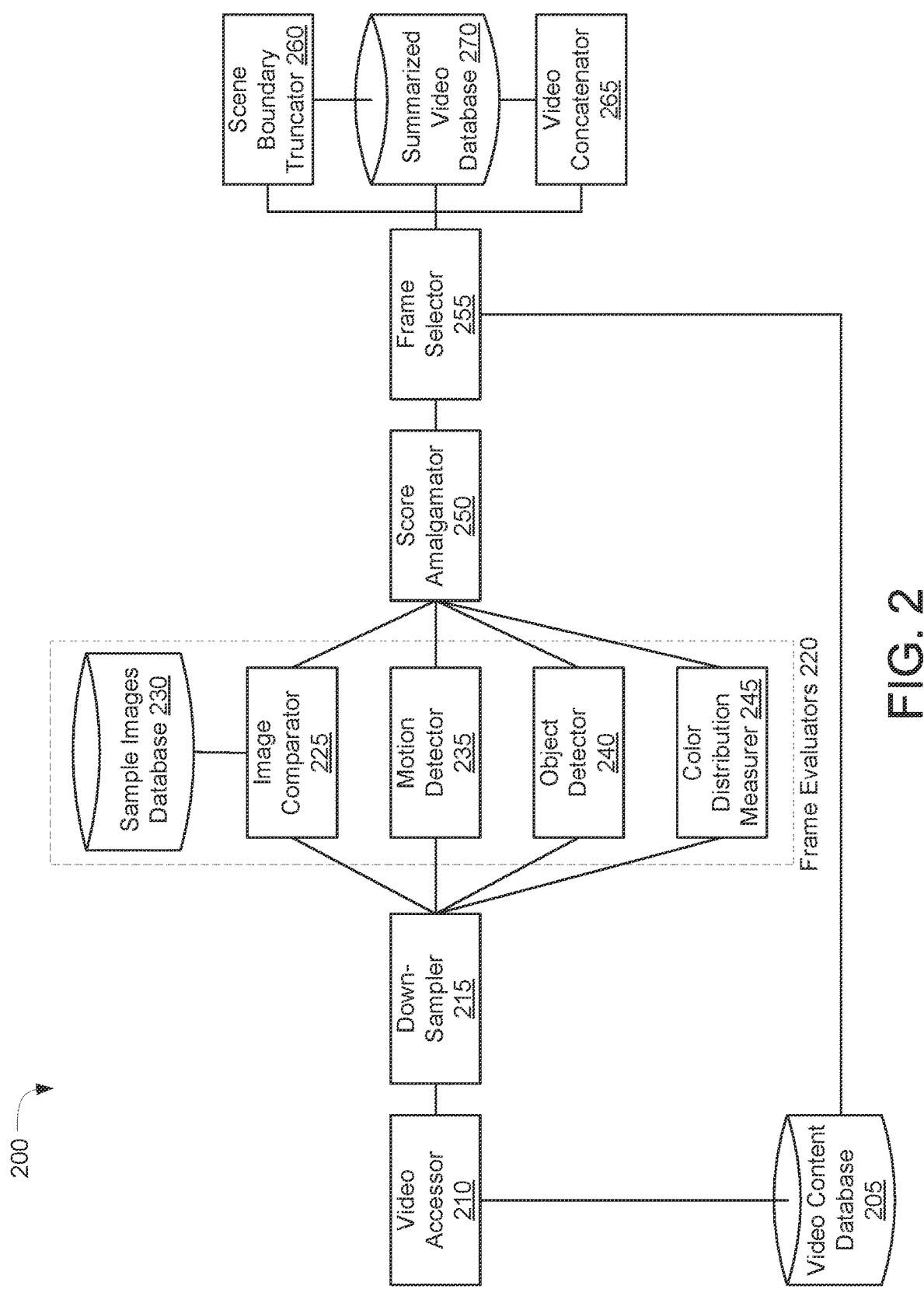
FIG. 2 is a block diagram depicting a system for automatically extracting summaries of video content in a computer network environment, according to an illustrative implementation.

Referring now to FIG. 2, depicted is a data processing system 200 for automatically extracting summaries of video content. Although only one data processing system 200 is illustrated, in many implementations, data processing system 200 may be a farm, cloud, cluster, or other grouping of multiple data processing systems or computing devices. The data processing system 200 can include at least one processor and a memory, sometimes referred to as a processing circuit, each of which are discussed in more detail below in connection with FIG. 4. The data processing system 200 can include a video accessor 210, a down-sampler or intervallic frame selector 215, one or more frame evaluators 220 (which may be provided in parallel, as shown; in serial, in any order; or in any combination of serial and parallel processing), a score amalgamator 250, a frame selector 255, and a scene boundary truncator 260. The one or more frame evaluators 220 can include an image comparator 225, a motion detector 235, an object detector 240, and a color distribution measurer 245, among others. Each of the video accessor 210, the down-sampler 215, the one or more frame evaluators 220, the score amalgamator 250, the frame selector 255, the scene boundary truncator 260, and the frame concatenator 265 can include hardware or a combination of software and hardware, such as one or more processors configured to execute one or more scripts or other computer logic. Each of the video accessor 210, the down-sampler 215, the one or more frame evaluators 220, the score amalgamator 250, the frame selector 255, the scene boundary truncator 260, and the frame concatenator 265 can include separate components, a single component, or be a part of the data processing system 110. The data processing system 200 can include content repositories or databases, such as the video content database 205, the sample images database 230, and the summarized video contents database 265. In some implementations, the data processing system 200 may be divided amongst a plurality of computing devices, including physical computing devices, virtual computing devices executed by physical computing devices, clusters, server farms, clouds, or other such parallel or scalable systems.

In further detail, the video accessor 210 can access the video content database 205 to identify or retrieve a video content element 105. The video content database 205 can include one or more original video content elements 105. Each original video content element 105 can include one or more frames 110-1 through 110-N. The original video content element 105 can include a specified frame rate (e.g., 10 frames per second to 600 frames per second, or any other such values). In some implementations, the video accessor 210 can receive a request to summarize the content or generate a summary. The request to summarize the content can include a video content identifier. The video content identifier can include an address referencing the video content element 105 (e.g., a uniform resource locator (URL), unique resource identifier (URI), or any other identifier of the content). Using the video content identifier included in the request, the video accessor 210 can retrieve or identify the video content element 105. In some implementations, the request to summarize the content can include the video content element 105 itself. Upon receiving the video content element 105, the video accessor 210 can store or save the video content element 105 onto the video content database 205. In some implementations, the request to summarize the content can include a target truncation or summary time (e.g. ten seconds, five seconds, one minute, or any other such time). In some implementations in which the video content is provided in a compressed format, upon retrieving the video content element 105, the video accessor 210 can decompress the video content element 105. Using the decompressed video content element 105, the video accessor 210 can generate a rendering of each frame 110-1 through 110-N of the video content element 105. In other implementations, processing may be performed on the compressed video content element 105 directly without requiring decompression or conversion. In still other implementations, decompression of the content may be performed later or on an as-needed basis by frame evaluators 220. For example, in one such implementation, the content may be down-sampled prior to decompression, to avoid decompressing frames that will be discarded or not analyzed.

As discussed above, to reduce the computational complexity in analyzing the video content element 105 identified by the video accessor 210, the down-sampler 215 can down-sample the frames 110-1 through 110-N of the video content element 105 at a sampling rate (e.g., 1 frame per second to 60 frames per second). In some implementations, the down-sampler 215 can select an intervallic subset of the frames 110-1 through 110-N of the video content element 105 at an identified sampling or subsampling rate. The intervallic subset can include a periodic sample of frames 110-1 through 110-N from the video content element 105 at the sampling rate, such as one out of ten frames, one out of twenty frames, etc. The intervallic subset can form the down-sampled video content element 105' (e.g., with frames 110-1, 110-11, 110-22, to 110-M as illustrated in FIG. 1).

In some implementations, the down-sampler 215 can identify or determine the sampling rate to down-sample the video content element 105. In one implementation, the down-sampler 215 can identify the specified frame rate of the original video content element 105. Using the identified frame rate of the original video content element 105, the down-sampler 215 can calculate a sampling rate for selecting the intervallic subset of frames. In some implementations, the down-sampler 215 can calculate the sampling rate as a specified percentage (e.g., 1-50%) of the frame rate of the original video content element 105. In some implementations, the down-sampler 215 can identify a length of the video content element 105. The down-sampler 215 can determine the sampling rate based on the length and the frame rate of the original video content element 105. In some implementations, the down-sampler 215 can determine sampling rate further based on the target truncation time. In some implementations, the down-sampler 215 can calculate the sampling rate as a specified percentage of an inverse of the target truncation time (e.g., 1-50%). In still other implementations, the down-sampler 215 may calculate the sampling rate to achieve a target output number of down-sampled frames (e.g. the sampling rate may be calculated as the target number of frames divided by the source or input number of frames). Thus, sampling rates may be of longer periods or lower frequencies for longer videos, in some implementations.

Using the intervallic subset forming the down-sampled video content element 105', the data processing system 200 can apply one or more frame evaluators 220 to the extracted subset of frames to determine a score for each of the frames. The score may include a numeric value indicative of the quality of the frames of the down-sampled video content element 105'. In some implementations, the score may be a normalized numeric value (e.g., 0 to 1, 0 to 10, −1 to 1, −10 to 10). The one or more frame evaluators 220 can include the image comparator 225, the motion detector 235, the object detector 240, and the color distribution measurer 245, among others. Each of the frame evaluators 220 can execute or run computationally expensive algorithms in analyzing the quality of each frame of video content and may be run in serial, in parallel, or in a combination of serial and parallel. As these algorithms may be applied to the down-sampled video content element 105' as opposed to the original video content element 105, computing resources and power consumption may be reduced and lowered, thereby improving the efficiency of the data processing system 200.

The image comparator 225 can compare each frame of the down-sampled video content element 105' to sample images in calculating a score for the frame. The image comparator 225 can access the sample images database 230, which may be stored in a storage device within the same computing device, accessed via a network, or otherwise accessible to image comparator 225. The sample images database 230 can include a set of sample images marked as positive and another set of sample images marked as negative. The set of sample images marked as positive may be associated with higher quality (e.g., higher sharpness, high contrast, high resolution, high colorfulness, etc.), and may be associated with a higher score (e.g., 0 to 1 on a −1-to-1 scale, 0.5 to 1 on a 0-to-1 scale, 0 to 10 on a −10-to-10 scale, 5 to 10 on a 0-to-10 scale, or any other such ranges). The set of sample images marked as negative may be associated with lower quality (e.g., blurry, low contrast, existence of artefacts, low resolution etc.), and may be associated with a lower score (e.g., −1 to 0 on a −1-to-1 scale, 0 to 0.5 on a 0-to-1 scale, −10 to 0 on a −10-to-10 scale, 0 to 5 on a 0-to-10 scale, or any other such ranges, distinct from the ranges used for higher scores). In some implementations, the two sets of sample images may be pre-designated as positive or negative. The set of sample images may be extracted from other video content elements.

Using the sets of images marked as positive or negative, the image comparator 225 can calculate distance measures between the frame and sets of images. In some implementations, the image comparator 225 can calculate a distance metric between the frame and the set of sample images marked as positive. In some implementations, the image comparator 225 can calculate a distance metric between the frame and the set of sample images marked as negative. The distance metrics may be based on quality, such as sharpness, contrast, and resolution, among other measures. In some implementations, the image comparator 225 can maintain a model to compare each frame to the set of sample images marked as positive or negative (e.g., a Bayesian network, an artificial neural network, or a hierarchical model, etc.). By applying artificial intelligence algorithms (e.g., supervised learning techniques, deep learning, support vector machines, etc.), the model may be trained using the sets of images marked as positive or negative. In some implementations, using the model, the image comparator 225 can calculate two distance metrics between the frame and the set of sample images marked as positive and between the frame and the set of sample images marked as negative. Thus, image comparator 225 may generate a positive distance metric (or distance metric to the positive set of sample images) and negative distance metric (or distance metric to the negative set of sample images) for each frame, each metric based on a weighted sum of coefficients extracted from comparisons of the frame to the positive or negative sample images, the weights dynamically determined during training of the model. For example, coefficient weights for sharpness may be higher than coefficient weights for resolution or contrast, or vice versa.

The closer the distance metric of the frame of the down-sampled video content element 105' is to the set of images marked as positive, the higher the score for the frame may be. Conversely, the closer the distance metric the frame of the down-sampled video content element 105' is to the set of images marked as negative, the lower the score for the frame may be. With the two calculated distance metrics between the frame and the two respective sets of images marked as positive or negative, the image comparator 225 can calculate a score for each frame. In some implementations, the image comparator 225 can calculate the score as a combination of the two distance metrics. In some implementations, the score may be a linear sum of the two distance metrics, while in other implementations, either or both metrics may be further weighted or adjusted (e.g. logarithmically, adjusted based on an average of other metrics, etc.). The image comparator 225 can repeat the above processing for each frame of the down-sampled video content element 105'.

The motion detector 235 can analyze or determine an amount of motion between adjacent frames of the down-sampled video content element 105' to calculate the score for each frame. The motion detector 235 can identify two adjacent frames within the intervallic subset of frames (e.g., frame 110-1 and 110-11 as shown in FIG. 1). The motion detector 235 can apply motion detection algorithms to calculate a motion metric between the two identified adjacent frames. In some implementations, the motion detector 235 can determine a color value (e.g., RGB value) of each pixel or a block of pixels in two adjacent fames. From the color values for each pixel in the frame, the motion detector 235 can identify corresponding pixels or blocks of pixels in the adjacent frame in a different location within the frame, and generate a motion vector between the frames. Motion vectors may be calculated at different block sizes, from individual pixels to macroblocks of large groups of pixels, and motion vectors from different block sizes may, in some implementations, be averaged or added together. This may allow for identification of small fast moving objects within a larger, slowly moving region of the video. The motion metric may, in some implementations, be identical to or proportional to the motion vector. For example, fast motion may correspond to a high motion metric. In other implementations, fast motion may be poorly suited for a summary video, and accordingly, the motion metric may be inversely proportional to the motion vector, such that fast motion corresponds to a low motion metric or negative motion metric.

In some implementations, the motion detector 235 can compare the motion vectors between frames to a ceiling threshold and a floor threshold. The ceiling threshold and the floor threshold may be set so as to decrease the score of frames with excessive or minimal motion metrics. The motion detector 235 can calculate a difference between the motion vectors between frames and the ceiling threshold. The motion detector 235 can calculate a difference between the motion vectors between frames and the floor threshold. Based on the two differences, the motion detector 235 can calculate the score for the frame of the down-sampled video content element 105'. The motion detector 235 can repeat the functionality over the frames of the intervallic subset constituting the down-sampled video content element 105'.

The object detector 240 can apply image recognition algorithms to each frame of the down-sampled video content element 105' to identify one or more objects and to identify one or more characteristics and a type of the object. Based on the recognized objects, characteristics, the object detector 240 can calculate a score for the corresponding frame in the intervallic subset. The image recognition algorithms applied by the object detector 240 can include facial recognition algorithms, optical character recognition algorithms, and other computer vision techniques. For example, the object detector 240 may scan blocks of pixels, macroblocks, or regions to identify objects matching predetermined rule sets (e.g. blocks of contiguous pixels with matching colors, blocks of contiguous pixels with identical motion vectors, etc.) or matching other objects (e.g. via an image comparison search to a library of images, or other such methods).

To identify facial expressions on a frame, the object detector 240 can apply a facial recognition algorithm on the frames of the intervallic subset. The facial recognition algorithm can include linear discriminant analysis, elastic bunch graph matching, hidden Markov model, multilinear subspace learning, and principal component analysis. In some implementations, the object detector 240 can generate a gray-scale version of the frame of the intervallic subset of frames. The object detector 240 can identify a training set of facial images. The training set of facial images can include sample images with facial expressions. The object detector 240 can calculate a set of eigenvectors between the gray-scale version of the frame and the training set of facial images. The object detector 240 can calculate a distance metric using the set of eigenvectors (e.g., Euclidean distance). The object detector 240 can then compare the distance metric to a threshold metric. If the distance metric is less than the threshold, the object detector 240 can determine that a facial expression exists in the frame. If the distance metric is greater than or equal to the threshold, the object detector 240 can determine that a facial expression does not exist in the frame. The object detector 240 can set the score for the frame as zero for lacking a facial expression.

If a facial expression is detected in the frame, the object detector 240 can then identify one or more characteristics of the frame of the down-sampled video content element 105'. The one or more characteristics can include size, brightness, contrast, resolution, position, rounded-ness, and other properties of the facial expression. In some implementations, the one or more characteristics can include a size of an eye detected in the facial expression. The eye may be detected using computer vision techniques. The object detector 240 can set the score of the frame based on the one or more characteristics of the facial expression identified in the frame. The greater the size, brightness, contrast, resolution, and size of the eye of the identified facial expression, the higher the score calculated by the object detector 240 may be. The smaller the size, brightness, contrast, resolution, and size of the eye of the identified facial expression, the lower the score calculated by the object detector 240 may be. The object detector 240 can repeat the functionality over the frames of the intervallic subset constituting the down-sampled video content element 105'.

To detect text on a frame, the object detector 240 can apply an optical character recognition algorithm on the frames of the down-sampled video content element 105'. The optical character recognition algorithm can include pattern matching, pattern recognition, and other correlation techniques. In some implementations, the object detector 240 can generate a gray-scale version of the frame. The object detector 240 can then access a training set of characters. The training set of characters can include sample images with characters. The object detector 240 can determine a feature vector for the frame. The object detector 240 can then determine feature vectors for each character in the training set of characters. The object detector 240 can calculate a distance metric between the feature vector of the frame and the feature vectors of each character of the training set of characters. The object detector 240 can then compare the distance metric to a threshold. If the distance metric is less than the threshold, the object detector 240 can determine that a character exists in the frame. If the distance metric is greater than or equal to the threshold, the object detector 240 can determine that a character does not exist in the frame. The object detector 240 can set the score for the frame as zero for lacking a character.

If a character is detected in the frame, the object detector 240 can identify one or more characteristics of the character. The one or more characteristics can include size, brightness, contrast, resolution, font, character type (e.g., "a", "l", "@"), position, and other properties of the characters. The object detector 240 can set the score of the frame based on the one or more characteristics of the character. The greater the size, brightness, contrast, resolution, and font, the higher the score calculated by the object detector 240 may be. The smaller the size, brightness, contrast, resolution, and font, the lower the score calculated by the object detector 240 may be. In some implementations, the object detector 240 can identify a number of characters on the frame. Using the identified number of frames, the object detector 240 can calculate the score. The object detector 240 can repeat the functionality over the frames of the intervallic subset constituting the down-sampled video content element 105'.

The color distribution measurer 245 can use a color distribution of the pixels on a frame to determine a score for each frame of the intervallic subset. The color distribution measurer 245 can traverse pixels of the frame to identify a color value (e.g., RGB value) of each pixel. The color distribution measurer 245 can determine the color distribution using the identified color values of the pixels on the frame. The color distribution can include a mean value, a standard deviation, and a variance of the color values of the pixels on the frame, among others. In some implementations, the color distribution can be a three-dimensional value, corresponding to a measure of deviation among the RGB values. The color distribution measurer 245 can calculate the score based on the determined color distribution of the frame. In some implementations, the color distribution measurer 245 can access a mapping of the color distribution to scores. The mapping may be a data structure stored in memory. The mapping can specify a score for particular color distributions. Using the mapping, the color distribution measurer 245 can calculate the score for the frame. The color distribution measurer 245 can repeat the functionality over the frames of the intervallic subset constituting the down-sampled video content element 105'.

Taking the scores calculated by each of the frame evaluators 220, the score amalgamator 250 can calculate a composite score 125A-125M for each frame of the down-sampled video content element 105'. In some implementations, the composite score 125A-125M may be an average of the scores calculated by the one or more frame evaluators 220. In some implementations, the composite score 125A-125M may be a weighted average or a weighted sum of the scores calculated by the one or more frame evaluators 220. In some implementations, the score amalgamator 250 can identify weights for each of the scores calculated by the one or more frame evaluators 220. The weights may correspond to a constituent percentage for the score in the composite score 125A-125M (e.g., 35% for the score calculated by the image comparator 225, 10% for the score calculated by the motion detector 235, 30% for the score calculated by the object detector 240, and 25% for the score calculated by the color distribution measurer 245, or any other such distribution). In some implementations, the weights may be predetermined or pre-specified. In some implementations, the weights may be dynamically determined by the score amalgamator 250. In some implementations, the score amalgamator 250 can set the weights based on the length of the original video content element 105, the target truncation time, and a number of frames in the down-sampled video content element 105', among others. For example, for very short target truncation times, frames containing high scores based on text recognition may be rated higher than for longer target truncation times, as they may correspond to titles.

From the composite scores 125A-125M, the frame selector 255 can calculate a sum of composite scores 130A-130O for a subset of frames of the down-sampled video content element 105' within the sliding window 135. The frame selector 255 can set or calculate a length of the sliding window 135 or a number subset frames for the sliding window 135 based on the target truncation time. In some implementations, the length of the sliding window 135 may be set to one to select a single frame as a still image for the summarized video content element 105". In some implementations, the frame selector 255 can determine an overlap of the sliding window 135 based on the target truncation time. The overlap can include a number of frames used between two instances of the sliding window 135 for calculating the composite score sums 130A-130O. Once the length and the overlap of the sliding window 135 is set, the frame selector 255 can calculate the composite score sums 130A-130O for each subset of frames within the sliding window 135.

From the calculated composite score sums 130A-130O, the frame selector 255 can identify the highest composite score sum. The frame selector 255 can then identify the subset of frames of the down-sampled video content element 105' corresponding to the highest composite score sum. The subset of frames may include the same number of frames as the sliding window 135. The frame selector 255 can identify the subset of frames of the original video content element 105 as corresponding to the subset of frames of the down-sampled video content element 105' identified as corresponding to the highest composite score sum. In some implementations, the frame selector 255 can retrieve the original video content element 105 from the video content database 205. In some implementations, if the length of the sliding window 135 is set to one to select a single frame as a still image for the summarized video content element 105", the frame selector 255 can select the single frame identified as corresponding to the highest composite score sum as the summarized video content element 105". Accordingly, having identified, from the down-sampled subset of frames, a frame or frames having a highest composite score, the frame selector may "up-sample" back to the original source video content by retrieving the full set of frames corresponding to the frame or frames with the highest composite score and frames within the sliding window. In one implementation, given source video content with 30 frames per second, the content may be down-sampled to one frame per second and analyzed. The sliding window may correspond to 10 seconds of video, or 10 down-sampled frames. Upon identifying a frame having a highest composite score, the frame selector may retrieve the corresponding 10 seconds of video from the original source video content including the identified frame (i.e. 300 frames at the original 30 frames per second, rather than 10 frames at the down-sampled rate). The retrieved frames may be used to generate the summary video at the original frame rate.

In some implementations, the frame selector 255 can traverse through the frames 110-1 through 110-N of the original video content element 105 to identify the subset of frames corresponding to the subset of frames of the down-sampled video content element 105' identified as corresponding to the highest composite score. The frame selector 255 can identify an initial frame of the original video content element 105 corresponding to the initial frame of the down-sampled video content element 105' of the subset frame identified as corresponding to the highest composite score sum. As the frame selector 255 traverses frames 110-1 through 110-N, the frame selector 255 can select the frame 110-1 through 110-N, and include or insert the selected frame 110-1 through 110-N as part of the summarized video content element 105". The frame selector 255 can traverse through the frames 110-1 through 110-N of the original video content element 105, until the frame selector 255 identifies a frame of the original video content element 105 as corresponding to one of the subset of frames in the down-sampled video content element 105'. If the frame of the subset of frames in the down-sampled video content element 105' is the terminal frame, the frame selector 255 can select the remainder of the frames 110-1 through 110-N of the original video content element 105 numbering the sampling interval. If the frame of the subset of frames in the down-sampled video content element 105' is not the terminal frame, the frame selector 255 can continue to select the frames 110-1 through 110-N of the original video content element 105. Using the frames 110-1 through 110-N of the original video content element 105 selected as corresponding to the subset of frames of the down-sampled video content element 105', the frame selector 255 can generate the summarized video content element 105". In some implementations, the frame selector 255 can store the summarized video content element 105" onto the summarized video database 270, responsive to generating the summarized video content element 105". The frame selector 255 can also store a correspondence identifier for the summarized video content element 105" to reference the original video content 105 used to generate the summarized video content element 105".

As the down-sampled video content element 105' was used to analyze the quality of the frames, the summarized video content element 105" can include more than one scene in the video content and can also include sudden or unexpected visual changes (e.g., color) that may be unpleasant to viewers of the summarized video content element 105". To reduce the number of scenes, the scene boundary truncator 260 can identify one or more shot boundaries from the summarized video content element 105". From a visual perspective, the shot boundaries may correspond to frames that transition from one scene to another scene. Such transitions may correspond with a rapid change in color from one frame to the next frame, or a fade to or from black. Upon truncation of the summarized video content element 105", the scene boundary truncator 260 can store the truncated, summarized video content element 105" onto the summarized video database 270.

Beginning with the start of the summarized video content element 105", the scene boundary truncator 260 can traverse the frames to detect an initial shot boundary frame among the frames. While traversing, the scene boundary truncator 260 can identify a color distribution of the pixels of the frame. The color distribution can include a mean value, a standard deviation, and a variance of the color values of the pixels on the frame, among others. In some implementations, the color distribution can be a three-dimensional value, corresponding to a measure of deviation among the RGB values. The scene boundary truncator 260 can compare the color distribution of the current frame with the color distribution of the previous frame of the summarized video content element 105". The scene boundary truncator 260 can determine a difference between the color distribution of the current frame and the color distribution of the previously frame. The scene boundary truncator 260 can compare the difference to a threshold. If the difference is greater than the threshold, the scene boundary truncator 260 can identify the current frame as the initial shot boundary frame. The scene boundary truncator 260 can then remove the frames prior to the initial shot boundary frame from the summarized video content element 105". If the difference is less than the threshold, the scene boundary truncator 260 can identify the current frame as a non-shot boundary frame and can continue to traverse the frames of the summarized video content element 105".

In some implementations, the scene boundary truncator 260 can continue to traverse the frames of the summarized video content element 105" using the difference in color distribution between frames to detect a scene change or shot boundary. The scene boundary truncator 260 can maintain a number of shot boundaries and increment the number of shot boundaries, upon detection of a shot boundary. In some implementations, the scene boundary truncator 260 can compare the number of shot boundaries to a maximum number of scenes. If the number of shot boundaries is equal to or greater than the maximum number, the scene boundary truncator 260 can remove the frames subsequent to the frame corresponding to the shot boundary from the summarized video content element 105".

Starting from the end of the summarized video content element 105", the scene boundary truncator 260 can traverse the frames to detect a terminal shot boundary frame among the frames. While traversing, the scene boundary truncator 260 can identify a color distribution of the pixels of the frame. The color distribution can include a mean value, a standard deviation, and a variance of the color values of the pixels on the frame, among others. In some implementations, the color distribution can be a three-dimensional value, corresponding to a measure of deviation among the RGB values. The scene boundary truncator 260 can compare the color distribution of the current frame with the color distribution of the previously traversed frame of the summarized video content element 105". The scene boundary truncator 260 can determine a difference between the color distribution of the current frame and the color distribution of the previously traversed frame. The scene boundary truncator 260 can compare the difference to a threshold. If the difference is greater than the threshold, the scene boundary truncator 260 can identify the current frame as the terminal shot boundary frame. The scene boundary truncator 260 can then remove the frames subsequent to the terminal shot boundary frame from the summarized video content element 105". If the difference is less than the threshold, the scene boundary truncator 260 can identify the current frame as a non-shot boundary frame and can continue to traverse the frames of the summarized video content element 105".

The video concatenator 265 can add other frames of the original video content element 105 to the summarized video content element 105". The video concatenator 265 can identify the remaining frames from the original video content element 105 not selected for the summarized video content element 105". In some implementations, the video concatenator 265 can select a predetermined number of frames from the end of the original video content element 105 to add to the summarized video content element 105". In some implementations, using image recognition algorithms, the video concatenator 265 can identify a contiguous set of frames from the remaining frames that include one or more predesignated objects. The one or more predesignated objects can include a particular type of text and a particular type of image (e.g., logos or brands), among others. The image recognition algorithms used to identify the one or more predesignated objects can include optical character recognition, object recognition, blob detection, edge detection, and other computer vision techniques. While traversing the remaining frames of the video content element 105, the video concatenator 265 can identify one or more sets of contiguous frames that include the one or more objects. Subsequent to traversing the remaining frames, the video concatenator 265 can add the one or more sets of contiguous frames to the summarized video content element 105". In some implementations, the video concatenator 265 can concatenate, append, or insert the one or more sets of contiguous frames to the summarized video content element 105". Once added, the video concatenator 265 can save the modified, summarized video content element 105" to the summarized video content database 270.

Referring now to FIGS. 3A-3E, depicted are a flow diagram of a method 300 of automatically extracting summaries of video content, according to an illustrative implementation. The functionality described herein described in the method 300 can be performed by data processing system or any one or more components or modules of the data processing system 200 shown in FIG. 2 or of the system 400 in FIG. 4.

Figure 3A:
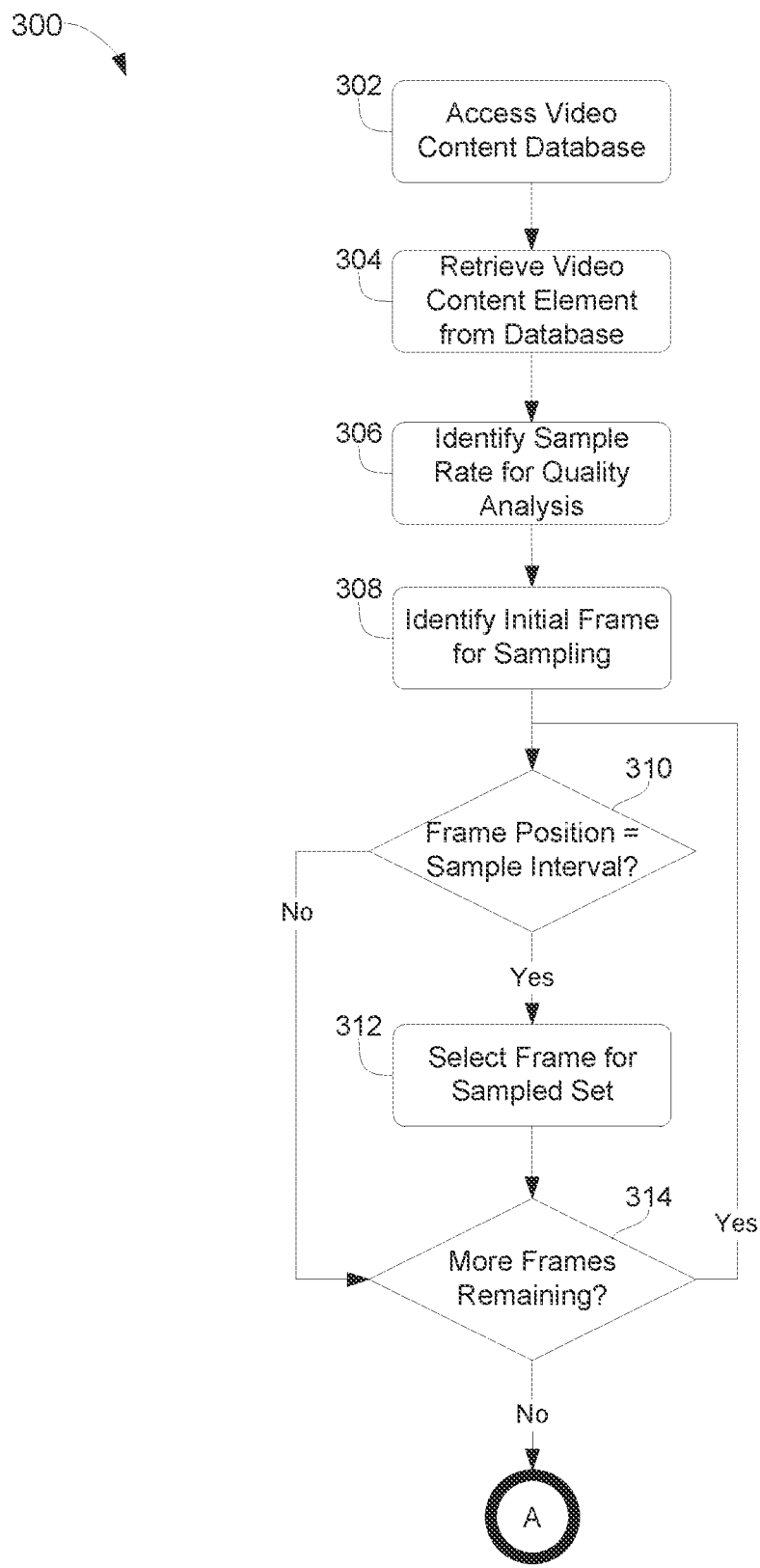
FIG. 3A-3E are flow diagrams depicting a method of automatically extracting summaries of video content in a computer network environment, according to an illustrative implementation.

Starting from FIG. 3A, at step 302, the data processing system can access a video content database. At step 304, the data processing system can retrieve a video content element from the video content database. In some implementations, the data processing system can un-compress the video content element. At step 306, the data processing system can identify a sampling rate for quality analysis. At step 308, the data processing system can identify an initial frame of the video content element retrieved from the database. At step 310, the data processing system can determine whether a frame position equals a sample interval defined by the sampling rate. If the frame position equals the sample interval, at step 312, the data processing system can select the frame for the sampled set. In any event, at step 314, the data processing system can determine whether there are more frames remaining. If so, the data processing system can repeat the functionalities of steps 310-314.

Figure 3B:
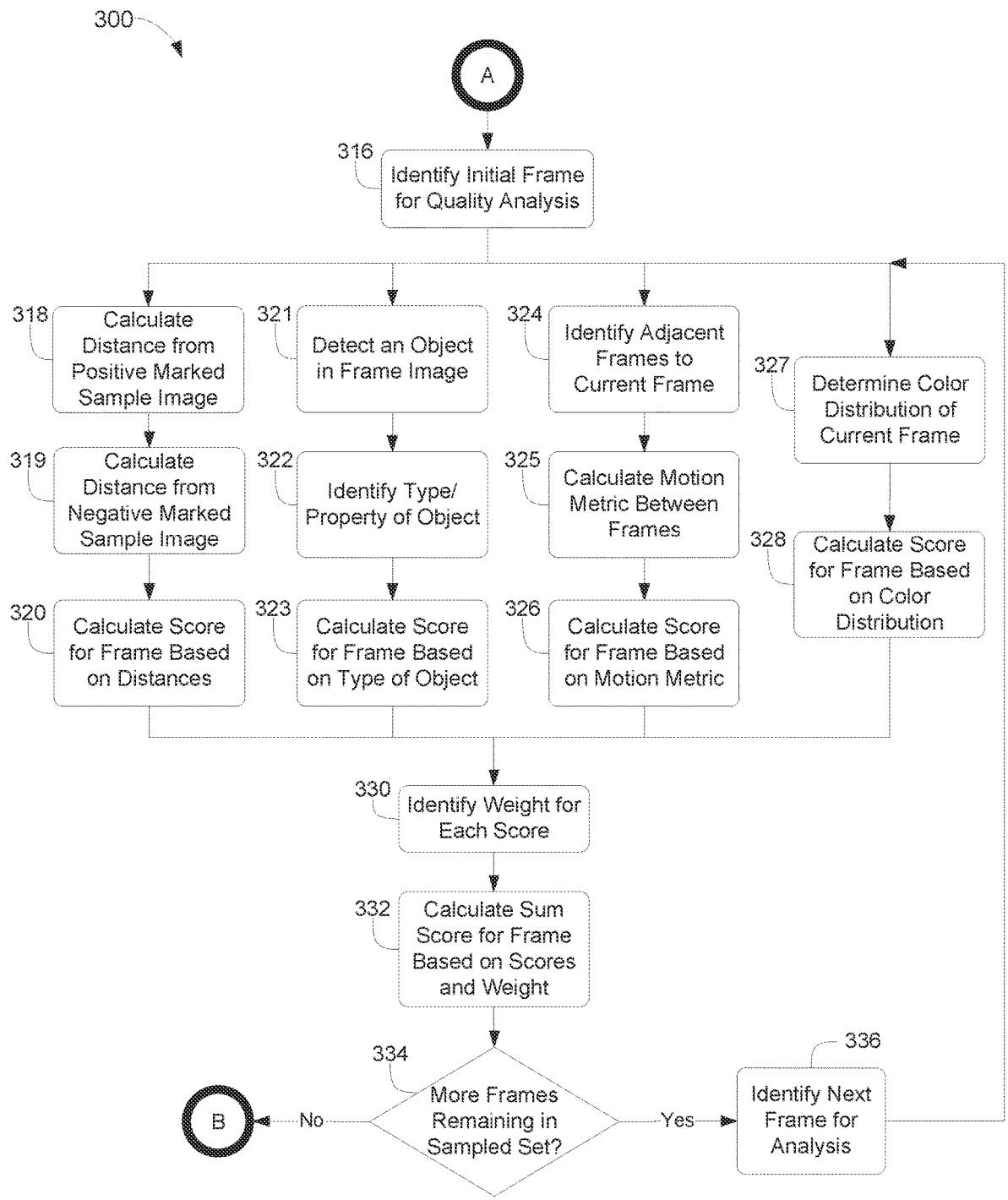

Moving on to FIG. 3B, if there are no more remaining frames, at step 316, the data processing system can identify an initial frame of the sampled set for quality analysis (e.g., functionalities at steps 318-328). At step 318, the data processing system can calculate a distance of the current frame from a positive marked sample image. At step 319, the data processing system can calculate a distance of the current frame from a negative marked sample image. At step 320, the data processing system can calculate a score for the frame based on the distances. At step 321, the data processing system can detect an object in an image of the frame. At step 322, the data processing system can identify a type or property of the object in the image of the frame. At step 323, the data processing system can calculate a score for the frame based on the identified type or property of the object in the image. At step 324, the data processing system can identify frames adjacent to the current frame. At step 325, the data processing system can calculate a motion metric between the adjacent frames and the current frame. At step 326, the data processing system can calculate a score for the frame based on the motion metric. At step 327, the data processing system can determine a color distribution for the current frame. At step 328, the data processing system can calculate a score for the frame based on the color distribution.

Continuing on, at step 330, the data processing system can identify a weight for each score calculated at steps 320, 323, 326, and 328. At step 332, the data processing system can calculate a sum score for the frame based on the scores and identified weight for each score. At step 334, the data processing system can determine whether there are more frames remaining in the sampled set. If there are remaining frames left in the sampled set, at step 336, the data processing system can identify the next frame for analysis, and can repeat the functionalities for steps 318-336.

Figure 3C:
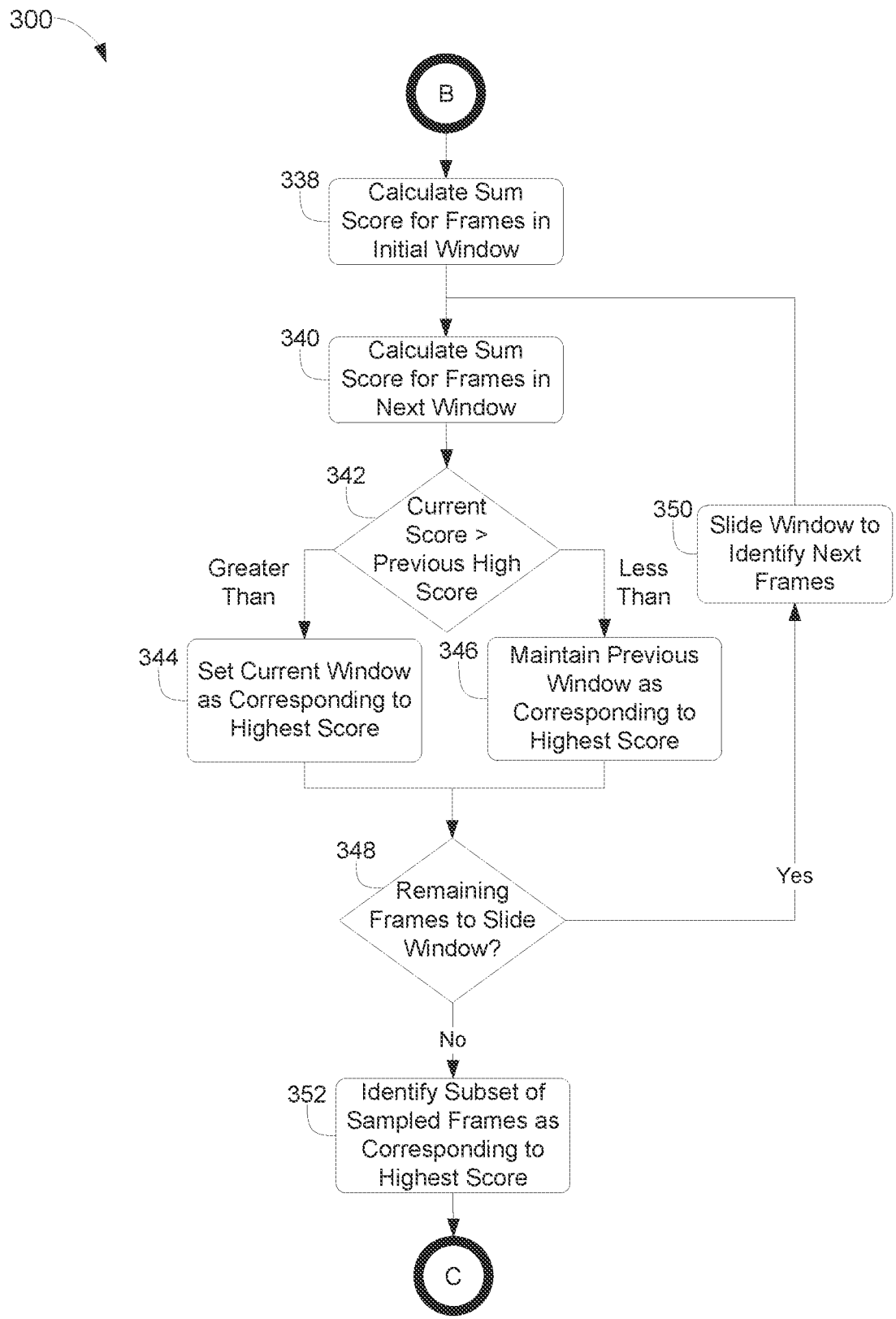

Now referring to FIG. 3C, if there are no more remaining frames left in the sampled set, at step 338, the data processing system can calculate a sum score for frames in an initial window. At step 340, the data processing system can calculate a sum score for frames in a subsequent window. At step 342, the data processing system can compare the current sum score to the previous high sum score. If the current sum score is greater than the previous high sum score, at step 344, the data processing system can set the subset of frames in the current window as corresponding to the highest sum score. If the current sum score is less than the previous high sum score, at step 346, the data processing system can maintain the subset of frames in the previously identified window as corresponding to the highest sums score. At step 348, the data processing system can determine whether there are more frames remaining in the sampled set. If there are more frames remaining in the sampled set, at step 350, the data processing system can slide the window over to a next subset of frames in the sampled set. If there are no more frames remaining in the sampled set, at step 352, the data processing system can identify the subset of frames in the sampled set determined as corresponding to the highest sum score.

Figure 3D:
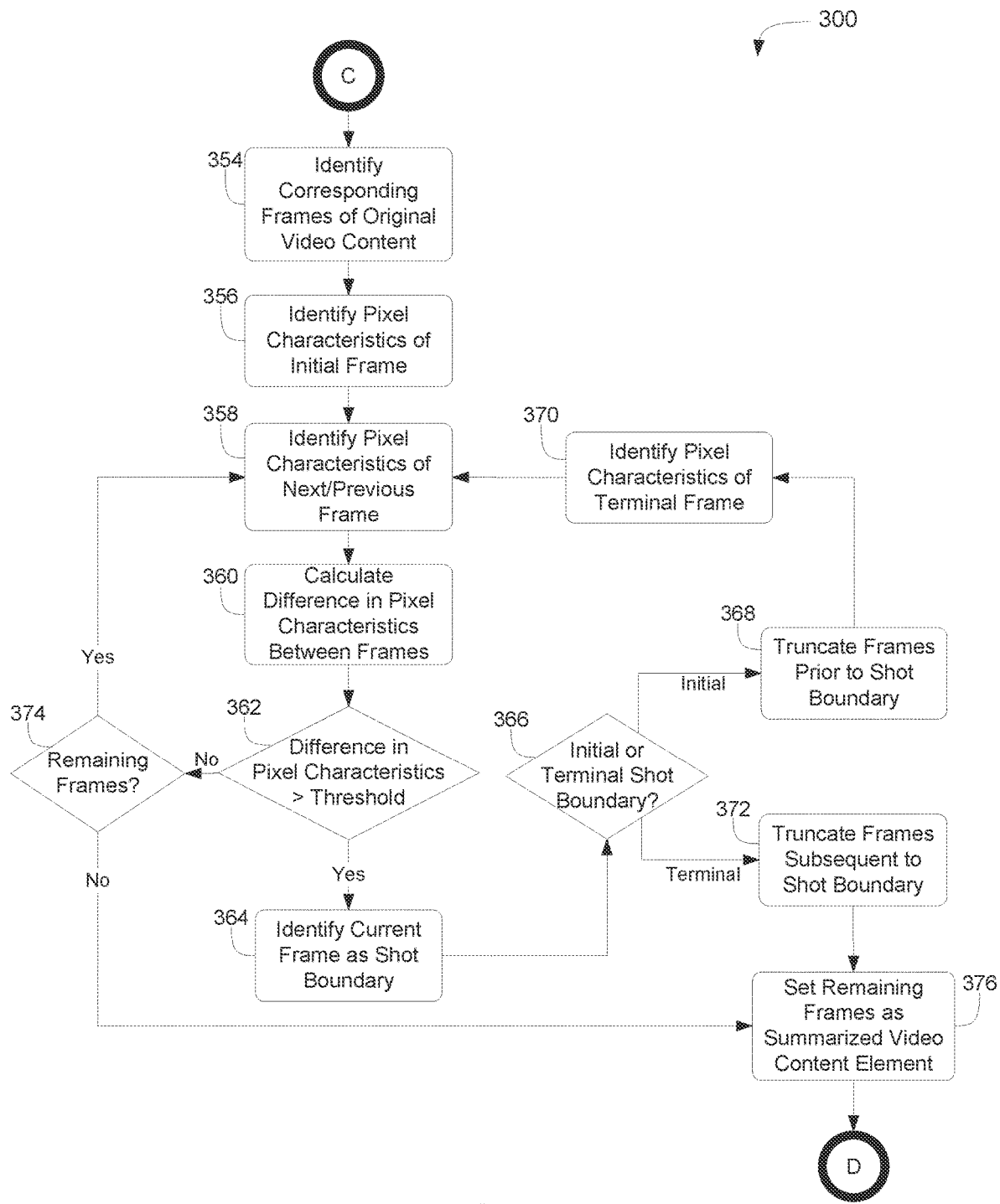

Continuing onto FIG. 3D, at step 354, the data processing system can identify a subset of frames of the original video content element corresponding to the subset of frames in the sampled set identified as corresponding to the highest sum score. At step 356, the data processing system can identify pixel characteristics of an initial frame in the original video content element. At step 358, the data processing system can identify pixel characteristics of the next frame in the original video content element. Initially, the data processing system can traverse the identified subset of frames of the original video content element from the initial frame, while identifying the shot boundaries of the frames of the original video content. At step 360, the data processing system can calculate a difference in pixel characteristics between the two frames.

At step 362, the data processing system can determine the difference in pixel characteristics is greater than the threshold. If the difference in pixel characteristics is greater than the threshold, at step 364, the data processing system can identify the current frame as the shot boundary. At step 366, the data processing system can determine whether the identified shot boundary is an initial or terminal shot boundary.

If the shot boundary is detected for the first time, the data processing system can identify the detected shot boundary as the initial shot boundary. If the shot boundary is initial, at step 368, the data processing system can truncate frames prior to the shot boundary. At step 370, the data processing system can identify the pixel characteristics of the terminal frame of the subset of frames of the original video content element. In repeating steps 358-366 and 374, the data processing system can traverse the subset of frames of the original video content element from the terminal frame. If the shot boundary is terminal, at step 372, the data processing system can truncate frames subsequent to the shot boundary. At step 374, the data processing system can determine whether there are more frames remaining in the original video content element. If there are remaining frames left, the data processing system can repeat the functionalities of steps 358-372. If there no more remaining frames left, at step 376, the data processing system can set the remaining frames as the summarized video content element.

Figure 3E:
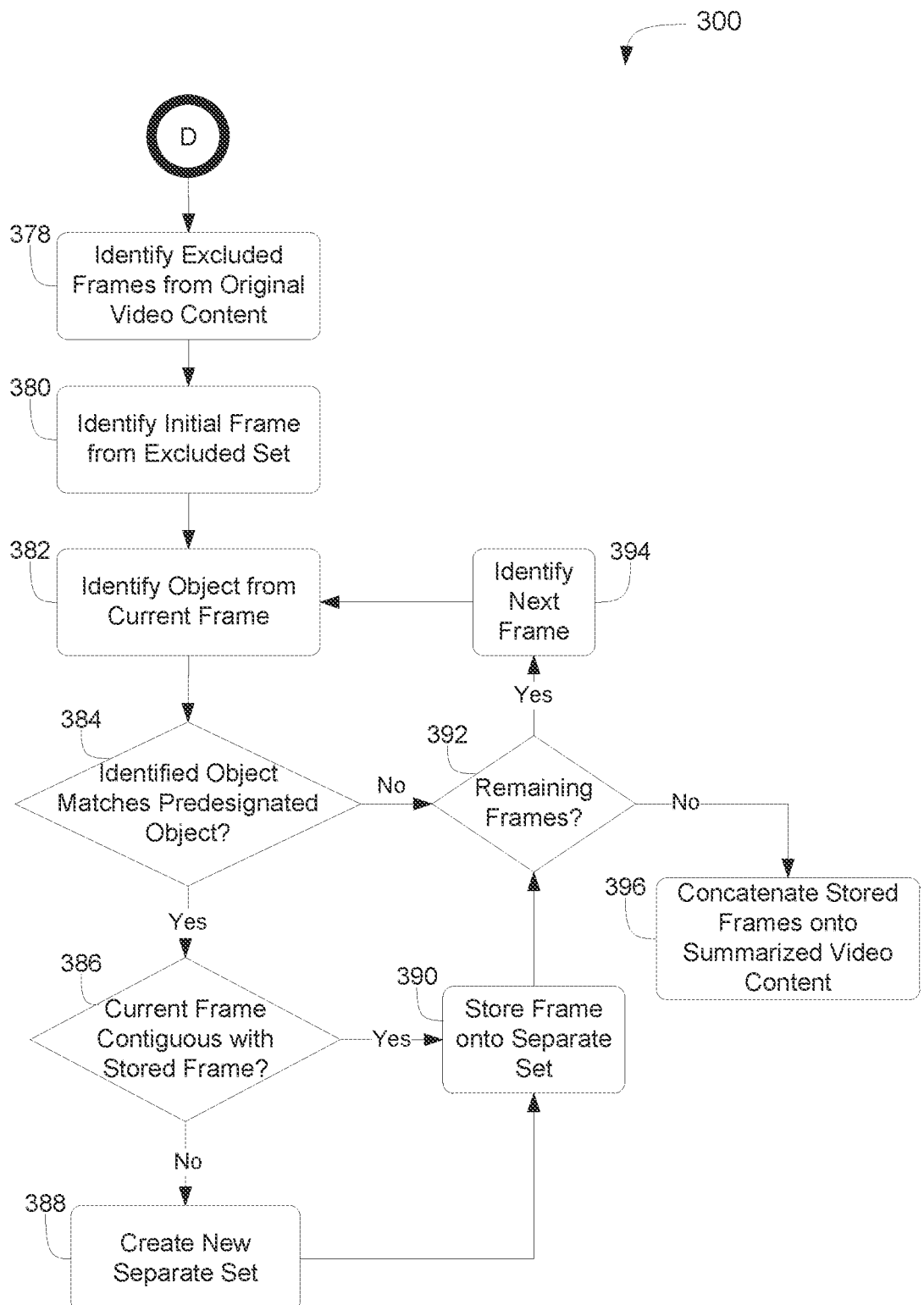

Referring lastly to FIG. 3E, at step 378, the data processing system can identify remaining frames from the original video content element not included in the summarized video content element. At step 380, the data processing system can identify an initial frame from the excluded set of frames. At step 382, the data processing system can identify an object from the current frame using image recognition algorithms. At step 384, the data processing system can determine whether the identified object matches a predesignated object.

If the detected object matches the predesignated object, at step 836, the data processing system can determine whether the current frame is contiguous with previously stored frame. If the current frame is not contiguous with the previously stored frame, at step 388, the data processing system can create a new separate set. In any event, at step 390, the data processing system can store the frame onto the separate set. At step 392, the data processing system can determine whether there are more frames remaining in the original video content element. If there are remaining frames left, the data processing system can identify the next frame from the set of frames excluded from the summarized video content element, and repeat the functionalities of steps 382-392. If there no more remaining frames left, at step 396, the data processing system can concatenate the frames of the stored set onto the summarized video content element.

Figure 4:
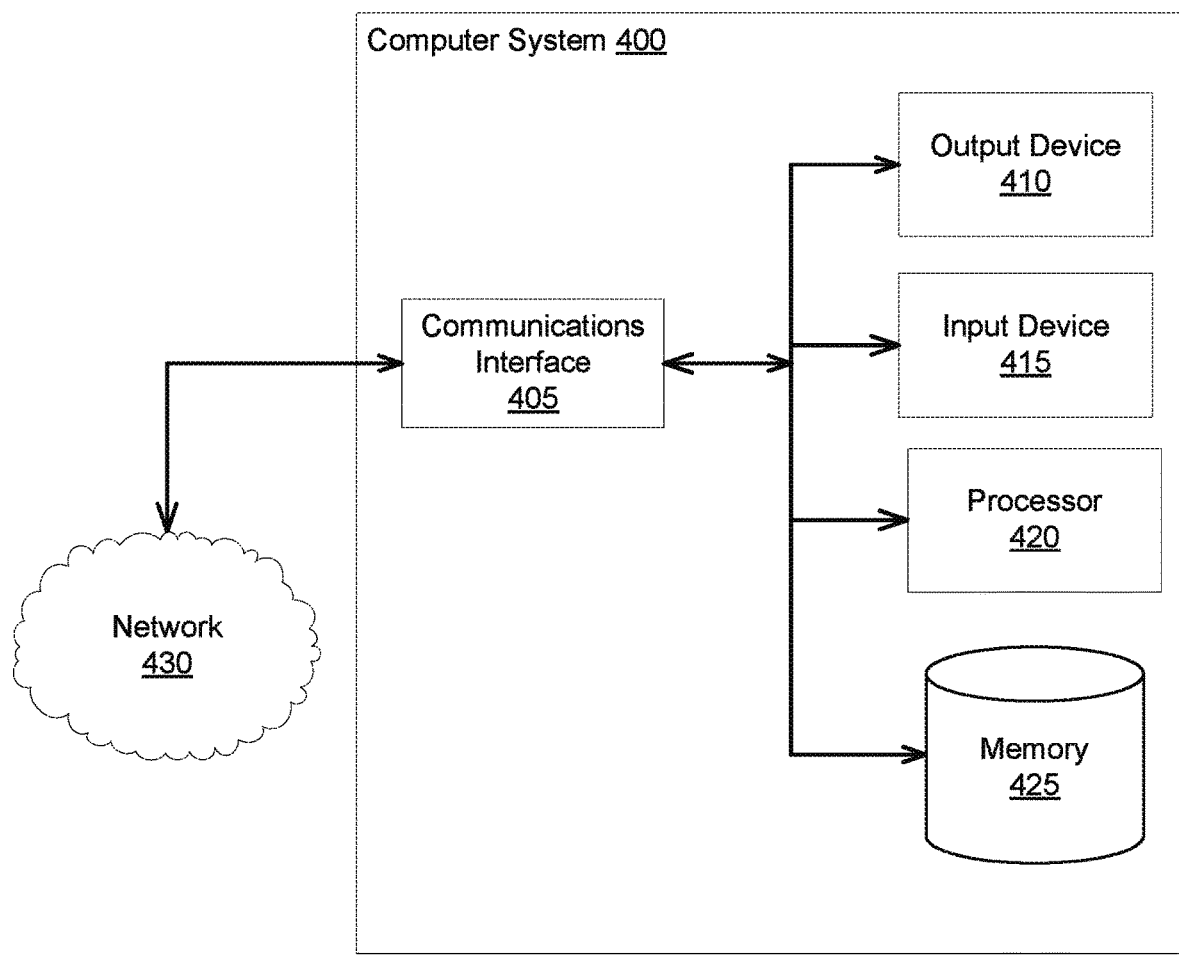
FIG. 4 is a block diagram illustrating a general architecture for a computer system that may be employed to implement elements of the systems and methods described and illustrated herein, according to an illustrative implementation.

FIG. 4 shows the general architecture of an illustrative computer system 400 that may be employed to implement any of the computer systems discussed herein (including the system 200 and its components such as the video accessor 210, the down-sampler 215, the one or more frame evaluators 220, the score amalgamator 250, the frame selector 255, the scene boundary truncator 260, and the frame concatenator 265) in accordance with some implementations. The computer system 400 can be used to provide information via the network 430 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 200 and its components, such as the video accessor 210, the down-sampler 215, the one or more frame evaluators 220, the score amalgamator 250, the frame selector 255, the scene boundary truncator 260, and the frame concatenator 265. The processors 420 can be also included in the video accessor 210, the down-sampler 215, the one or more frame evaluators 220, the score amalgamator 250, the frame selector 255, the scene boundary truncator 260, and the frame concatenator 265, among others.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). In the context of the data processing system 200, the memory 425 can include instructions for the video accessor 210, the down-sampler 215, the one or more frame evaluators 220, the score amalgamator 250, the frame selector 255, the scene boundary truncator 260, and the frame concatenator 265 to be processed by the processors 420. The memory 425 can also include the video content database 205, the sample images database 230, and the summarized video database 270. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 2, one or more communications interfaces facilitate information flow between the components of the system 400. In some implementations, the communications interface(s) may be configured (e.g., via various hardware components or software components) to provide a website as an access portal to at least some aspects of the computer system 400. Examples of communications interfaces 405 include user interfaces (e.g., web pages), through which the user can communicate with the data processing system 200.

The memory 425 can store processor-executable instructions that, when executed by processor, cause the processor to perform one or more of the operations described herein. The processor 420 may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory 425 may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language, such as the components of the data processing system 200 (e.g., the video accessor 210, the down-sampler 215, the one or more frame evaluators 220, the score amalgamator 250, the frame selector 255, the scene boundary truncator 260, and the frame concatenator 265).

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

The network 430 can include computer networks such as the internet, local, wide, metro or other area networks, intranets, satellite networks, other computer networks such as voice or data mobile phone communication networks, and combinations thereof. The data processing system 200 can communicate via the network 430 with other devices, such as one or more client devices, content provider servers, and/or content publisher servers. The network 430 may be any form of computer network that relays information between the data processing system 200, the client devices, content provider servers, and/or content publisher servers. For example, the network 430 may include the Internet and/or other types of data networks, such as a local area network (LAN), a wide area network (WAN), a cellular network, satellite network, or other types of data networks. The network 430 may also include any number of computing devices (e.g., computer, servers, routers, network switches, etc.) that are configured to receive and/or transmit data within network 430. The network 430 may further include any number of hardwired and/or wireless connections. For example, the client device may communicate wirelessly (e.g., via WiFi, cellular, radio, etc.) with a transceiver that is hardwired (e.g., via a fiber optic cable, a CAT5 cable, etc.) to other computing devices in network 430.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The video accessor 210, the down-sampler 215, the one or more frame evaluators 220, the score amalgamator 250, the frame selector 255, the scene boundary truncator 260, and the frame concatenator 265 can include or share one or more computing devices or processors (e.g., processor 420) of the data processing system 200

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network 430.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 200 can include clients and servers. For example, the data processing system 200 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the video accessor 210, the down-sampler 215, the one or more frame evaluators 220, the score amalgamator 250, the frame selector 255, the scene boundary truncator 260, and the frame concatenator 265 can be part of the data processing system 200, a single module, a logic device having one or more processing modules, one or more servers, or part of a search engine.

Thus, the systems and methods discussed herein provide for automatically generating or extracting summaries of video content, and may be provided to client devices quickly and efficiently at a fraction of the bandwidth and processing power required for delivery of the entire content. At least one aspect discussed herein is directed to a method of automatically extracting summaries of video content. A data processing system can access, from a video database, a first video content element including a first plurality of frame. The data processing system can select an intervallic subset of the first plurality of frames of the first video content element. The data processing system can calculate, for each of a plurality of further subsets comprising a predetermined number of frames from the intervallic subset, a score for the further subset. The data processing system can identify, from the plurality of further subsets, a further subset having a highest score. The data processing system can select a portion of the first video content element comprising the frames of the further subset having the highest score. The data processing system can generate a second video content element comprising the selected portion of the first video content element.

In some implementations, calculating the score for the further subset can further include calculating a first distance metric between the further subset and a positive sampled image set. In some implementations, calculating the score for the further subset can further include calculating a second distance metric between the further subset and a negative sampled image set. In some implementations, calculating the score for the further subset can further include calculating the score for the further subset based on a combination of the first distance metric and the second distance metric.

In some implementations, calculating the score for the further subset can further include detecting, using an image recognition algorithm, an object from the further subset. In some implementations, calculating the score for the further subset can further include identifying, using the image recognition algorithm, one or more properties of the object detected from the further subset. In some implementations, calculating the score for the further subset can further include calculating the score for the further subset based on the one or more properties identified from the object.

In some implementations, calculating the score for the further subset can further include calculating, between each frame of the further subset, a motion metric by applying a motion detection algorithm to the two corresponding frames. In some implementations, calculating the score for the further subset can further include calculating the score for the further subset based on the set of motion metrics calculated between each frame of the further subset.

In some implementations, calculating the score for the further subset can further include determining a color distribution among a plurality of pixels for the frames of the further subset. In some implementations, calculating the score for the further subset can further include calculating the score for the further subset based on the color distribution among the plurality of pixels for the frames of the further subset.

In some implementations, calculating the score for the further subset can further include calculating, for each of a plurality of further subsets, a plurality of scores by applying a corresponding number of image analysis algorithms to the frames of the further subset. In some implementations, calculating the score for the further subset can further include calculating the score based on a predetermined weighted average of the plurality of scores.

In some implementations, selecting the portion of the first video content element can further include identifying a first initial frame of the first video content element corresponding to a second initial frame of the further subset having the highest score. In some implementations, selecting the portion of the first video content element can further include identifying a first terminal frame of the first video content element corresponding to a second terminal frame of the further subset having the highest score. In some implementations, selecting the portion of the first video content element can further include selecting a subset of frames of the first video content element from the first initial frame to the first terminal frame.

In some implementations, generating the second video content element can further include detecting an initial shot boundary frame among the frames corresponding to the portion of the first video content element based on a first color change among the frames. In some implementations, generating the second video content element can further include detecting a terminal shot boundary frame among the frames corresponding to the portion of the first video content element based on a second color change among the frames. The second color change subsequent to the first color change. In some implementations, generating the second video content element can further include truncating a first sub-portion of the first video content element corresponding to an initial frame of the portion to the initial shot boundary frame. In some implementations, generating the second video content element can further include truncating a second sub-portion of the first video content element corresponding to a terminal shot boundary frame to a terminal frame of the portion.

In some implementations, calculating the score for the further subset can further include calculating the score for the further subset comprising one frame. In some implementations, generating the second video content element can further include generating the second video content element including one frame from the plurality of frames. In some implementations, the data processing system can identify a second subset of contiguous frames from the first plurality of frames including an object using an image recognition algorithm. In some implementations, the data processing system can concatenate the second subset of contiguous frames to the second video content element.

At least one aspect is directed to a system for automatically extracting summaries of video content. The system may include a data processing system. The data processing system can have one or more processors and memory. The data processing system can access, from a video database, a first video content element including a first plurality of frame. The data processing system can select an intervallic subset of the first plurality of frames of the first video content element. The data processing system can calculate, for each of a plurality of further subsets comprising a predetermined number of frames from the intervallic subset, a score for the further subset. The data processing system can identify, from the plurality of further subsets, a further subset having a highest score. The data processing system can select a portion of the first video content element comprising the frames of the further subset having the highest score. The data processing system can generate a second video content element comprising the selected portion of the first video content element.

In some implementations, the data processing system can calculate a first distance metric between the further subset and a positive sampled image set. In some implementations, the data processing system can calculate a second distance metric between the further subset and a negative sampled image set. In some implementations, the data processing system can calculate the score for the further subset based on a combination of the first distance metric and the second distance metric.

In some implementations, the data processing system can detect, using an image recognition algorithm, an object from the further subset. In some implementations, the data processing system can identify, using the image recognition algorithm, one or more properties of the object detected from the further subset. In some implementations, the data processing system can calculate the score for the further subset based on the one or more properties identified from the object.

In some implementations, the data processing system can calculate, between each frame of the further subset, a motion metric by applying a motion detection algorithm to the two corresponding frames. In some implementations, the data processing system can calculate the score for the further subset based on the set of motion metrics calculated between each frame of the further subset.

In some implementations, the data processing system can determine a color distribution among a plurality of pixels for the frames of the further subset. In some implementations, the data processing system can calculate the score for the further subset based on the color distribution among the plurality of pixels for the frames of the further subset. In some implementations, the data processing system can calculate, for each of a plurality of further subsets, a plurality of scores by applying a corresponding number of image analysis algorithms to the frames of the further subset. In some implementations, the data processing system can calculate the score based on a predetermined weighted average of the plurality of scores.

In some implementations, the data processing system can identify a first initial frame of the first video content element corresponding to a second initial frame of the further subset having the highest score. In some implementations, the data processing system can identify a first terminal frame of the first video content element corresponding to a second terminal frame of the further subset having the highest score. In some implementations, the data processing system can select a subset of frames of the first video content element from the first initial frame to the first terminal frame In some implementations, the data processing system can detect an initial shot boundary frame among the frames corresponding to the portion of the first video content element based on a first color change among the frames. In some implementations, the data processing system can detect a terminal shot boundary frame among the frames corresponding to the portion of the first video content element based on a second color change among the frames. The second color change may be subsequent to the first color change. In some implementations, the data processing system can truncate a first sub-portion of the first video content element corresponding to an initial frame of the portion to the initial shot boundary frame. In some implementations, the data processing system can truncate a second sub-portion of the first video content element corresponding to a terminal shot boundary frame to a terminal frame of the portion.

In some implementations, the data processing system can identify a second subset of contiguous frames from the first plurality of frames including an object using an image recognition algorithm. In some implementations, the data processing system can concatenate the second subset of contiguous frames to the second video content element.

At least one aspect is directed to a non-transitory computer readable medium storing instructions for automatically extracting summaries of video content. The instructions, when executed by one or more processors, can cause the one or more processors to perform the operations to perform operations. The operations can include accessing, from a video database, a first video content element including a first plurality of frames. The operations can include selecting, an intervallic subset of the first plurality of frames of the first video content element. The operations can include calculating, for each of a plurality of further subsets comprising a predetermined number of frames from the intervallic subset, a score for the further subset. The operations can include identifying, from the plurality of further subsets, a further subset having a highest score. The operations can include selecting a portion of the first video content element comprising the frames of the further subset having the highest score. The operations can include generating a second video content element comprising the selected portion of the first video content element.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to providing interactive content for display, the systems and methods described herein can include applied to other environments in which data included in a log database used and compared to data corresponding to previous requests for content and responsive to determining a change in the data, identifying one or more content elements to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of automatically extracting summaries of video content, comprising:
   accessing, by a data processing system, from a video database, a first video content element including a plurality of frames;
   down-sampling, by the data processing system, the first video content element to produce a first subset of the plurality of frames of the first video content element using periodic sampling of the plurality of frames with a sampling rate based on at least one of a length of the first video element, a target truncation time of a second video content element, and a target frame count of the plurality of frames in the first subset;
   calculating, by the data processing system, for each second subset of a plurality of second subsets consisting of one or more frames from the first subset, a score indicative of quality of the one or more frames in the each second subset;
   identifying, by the data processing system, from the plurality of second subsets, a second subset based on the score for the each second subset;
   selecting, by the data processing system, a set of consecutive frames of the first video content element comprising a first frame and a second frame of the identified second subset, wherein the first frame and the second frame are adjacent frames in the identified second subset, and the first frame and the second frame are non-adjacent frames in the set of consecutive frames of the first video content element, and wherein a number of frames in the set of consecutive frames of the first video content element is less than a number of frames in the first video content element, and the number of frames in the set of consecutive frames of the first video content element is greater than a number of frames in the identified second subset; and
   generating, by the data processing system, the second video content element comprising the set of consecutive frames of the first video content element.

2. The method of claim 1, wherein calculating the score further comprises calculating the score for the each second subset based on a comparison of the each second subset with at least one of a first sample image set marked as positive or a second sampled image set marked as negative.

3. The method of claim 1, wherein calculating the score further comprises calculating the score for the each second subset based on one or more properties of an object detected from the one or more frames of the each second subset.

4. The method of claim 1, wherein calculating the score further comprises calculating the score for the each second subset based on a motion metric among of the one or more frames of the each second subset.

5. The method of claim 1, wherein calculating the score further comprises calculating the score for the each second subset based on a color distribution among a plurality of pixels of the one or more frames of the each second subset.

6. The method of claim 1, wherein calculating the score further comprises calculating a plurality of scores for the each second subset using a corresponding plurality of image analysis algorithms on the one or more frames of the each second subset.

7. The method of claim 1, wherein selecting the set of consecutive frames of the first video content element further comprises identifying, from the plurality of frames of the first video content, an initial frame and a terminal frame for the set of consecutive frames of the first video content element based on the one or more frames of the identified second subset.

8. The method of claim 1, wherein generating the second video content element further comprises detecting, from a frame in the identified second subset and an adjacent frame, an initial shot boundary frame and a terminal shot boundary frame based on at least one change in color among the one or more frames of the identified second subset.

9. The method of claim 1, wherein generating the second video content element further comprises truncating the plurality of frames of the first video content based on an initial shot boundary frame and a terminal shot boundary frame, each detected from a frame in the identified second subset and an adjacent frame.

10. The method of claim 1, further comprising adding, by the data processing system, to the set of consecutive frames of the first video content element, one or more second frames from the plurality of frames of the first video content element having an object identified from at least one frame of the set of consecutive frames of the first video content element.

11. A system for automatically extracting summaries of video content, comprising:
    a data processing system having one or more processors and memory, configured to:
    access, from a video database, a first video content element including a plurality of frames;
    down-sample the first video content element to produce a first subset of the plurality of frames of the first video content element using periodic sampling of the plurality of frames with a sampling rate based on at least one of a length of the first video element, a target truncation time of a second video content element, or a target frame count of the plurality of frames in the first subset;
    calculate, for each second subset of a plurality of second subsets consisting of one or more frames from the first subset, a score indicative of quality of the one or more frames in the each second subset;
    identify, from the plurality of second subsets, a second subset based on the score for the each second subset;
    select a set of consecutive frames of the first video content element comprising a first frame and a second frame of the identified second subset, wherein the first frame and the second frame are adjacent frames in the identified second subset, and the first frame and the second frame are non-adjacent frames in the set of consecutive frames of the first video content element, and wherein a number of frames in the set of consecutive frames of the first video content element is less than a number of frames in the first video content element, and the number of frames in the set of consecutive frames of the first video content element is greater than a number of frames in the identified second subset; and generate the second video content element comprising the set of consecutive frames of the first video content element.

12. The system of claim 11, wherein the data processing system is further configured to calculate the score for the each second subset based on a comparison of the each second subset with at least one of a first sample image set marked as positive or a second sampled image set marked as negative.

13. The system of claim 11, wherein the data processing system is further configured to calculate the score for the each second subset based on one or more properties of an object detected from the one or more frames of the each second subset.

14. The system of claim 11, wherein the data processing system is further configured to calculate the score for the each second subset based on a motion metric among of the one or more frames of the each second subset.

15. The system of claim 11, wherein the data processing system is further configured to calculate the score for the each second subset based on a color distribution among a plurality of pixels of the one or more frames of the each second subset.

16. The system of claim 11, wherein the data processing system is further configured to calculate a plurality of scores for the each second subset using a corresponding plurality of image analysis algorithms on the one or more frames of the each second subset.

17. The system of claim 11, wherein the data processing system is further configured to identify, from the plurality of frames of the first video content, an initial frame and a terminal frame for the set of consecutive frames of the first video content element based on the one or more frames of the identified second subset.

18. The system of claim 11, wherein the data processing system is further configured to detect, from a frame in the identified second subset and an adjacent frame, an initial shot boundary frame and a terminal shot boundary frame based on at least one change in color among the one or more frames of the identified second subset.

19. The system of claim 11, wherein the data processing system is further configured to truncate the plurality of frames of the first video content based on an initial shot boundary frame and a terminal shot boundary frame, each detected from a frame in the identified second subset and an adjacent frame.

20. The system of claim 11, wherein the data processing system is further configured to add, to the set of consecutive frames of the first video content element, one or more second frames from the plurality of frames of the first video content element having an object identified from at least one frame of the set of consecutive frames of the first video content element.

21. The system of claim 11, wherein to calculate the score, the system is further configured to calculate, using an artificial intelligence model, a distance metric between the each second subset and at least one of a first sample image set marked as positive or a second sampled image set marked as negative.

22. The system of claim 21, wherein the artificial intelligence model is a neural network.

23. The system of claim 21, wherein the first sample image set is associated with a higher quality and/or score than the second sample image set.

24. The system of claim 21, wherein to calculate the score for the each second subset, the system is further configured to calculate the score based on a weighted sum of coefficients extracted from a comparison of the each second subset with at least one of the first sample image set marked as positive or the second sampled image set marked as negative, and wherein weights of the weighted sum are dynamically determined during training of the artificial intelligence model.

25. The system of claim 13, wherein the system is further configured to detect the object from the one or more frames of the each second subset, at least in part by:
    calculating a feature vector of a frame of the one or more frames of the each second subset;
    calculating a distance metric between the feature vector of the frame and a feature vector of a set of training images associated with the object;
    comparing the distance metric with a threshold metric; and
    responsive to determining that the distance metric is less than the threshold metric, determining the object exists in the frame.

* * * * *

UNITED STATES PATENT AND TRADEMARK OFFICE
CERTIFICATE OF CORRECTION

| | | |
|---|---|---|
| PATENT NO. | : 12,118,036 B2 | Page 1 of 1 |
| APPLICATION NO. | : 17/352067 | |
| DATED | : October 15, 2024 | |
| INVENTOR(S) | : Yi Shen et al. | |

It is certified that error appears in the above-identified patent and that said Letters Patent is hereby corrected as shown below:

In the Claims

Column 28, Line 5, Claim 4, "among of the" should be -- among the --.

Column 29, Line 24, Claim 14, "among of the" should be -- among the --.

Signed and Sealed this
Twenty-second Day of April, 2025

Coke Morgan Stewart
*Acting Director of the United States Patent and Trademark Office*